United States Patent [19]

Miura et al.

[11] 4,020,012
[45] Apr. 26, 1977

[54] METHOD FOR PREPARING HYDROCARBON CONVERSION CATALYST

[75] Inventors: Tadashi Miura, Saitama; Tomio Nomura, Higashi-matsuyama; Kohei Kubota, Kasukabe, all of Japan

[73] Assignee: Toa Nenryo Kogyo Kabushiki Kaisha, Tokyo, Japan

[22] Filed: Dec. 29, 1975

[21] Appl. No.: 644,606

[30] Foreign Application Priority Data

Jan. 31, 1975 Japan .............................. 50-13239

[52] U.S. Cl. .............................. 252/441; 252/442; 252/439
[51] Int. Cl.$^2$ .......................................... B01J 27/06
[58] Field of Search ............... 252/429 R, 441, 442, 252/439

[56] References Cited

UNITED STATES PATENTS

| 3,720,628 | 3/1973 | Hayes et al. | 252/442 |
| 3,740,328 | 6/1973 | Rausch | 252/441 X |
| 3,801,498 | 4/1974 | Rausch | 252/441 X |
| 3,875,049 | 4/1975 | Kluksdahl | 252/441 X |
| 3,898,154 | 8/1975 | Rausch | 252/441 X |

OTHER PUBLICATIONS

Kirk–Othmer Encyclopedia of Chemical Technology, 2nd edition, vol. 10, 1963, pp. 163–164.

Primary Examiner—Winston A. Douglas
Assistant Examiner—John F. Niebling
Attorney, Agent, or Firm—Llewellyn A. Proctor

[57] ABSTRACT

A method for the preparation of a hydrocarbon conversion catalyst comprising a composite of a refractory support, or carrier, a Group VIII noble metal component, particularly platinum, a tin component, and a halogen component. Suitably, the catalyst composite can also contain a third metal component, or yet additional components. In the preparation of such catalyst, the tin is added from a solution of a soluble compound of tin comprised of an organo thionyl compound, or organic compound containing a thionyl group, whereby the tin component is uniformly dispersed from the surface into the inner part of a catalyst. Such catalyst is found useful in hydrocarbon conversion reactions, particularly reforming (hydroforming). A naphtha or straight run gasoline can be contacted with such catalyst at reforming conditions in the presence of hydrogen to improve the octane quality of a naphtha or gasoline.

12 Claims, 2 Drawing Figures

METHOD FOR PREPARING HYDROCARBON CONVERSION CATALYST

Catalytic reforming (i.e., hydroforming) is an established process in the petroleum refining industry and has been used for many years for the production of aromatic solvents, aromatic-rich chemical products, and blending stocks suitable for improving the octane quality of naphthas and straight run gasolines. Catalysts used in catalytic reforming are recognized as dual- or poly-functional, the catalyst composite including a component comprising a metal, or metals, or a compound or compounds thereof, providing a hydrogenation (hydrogen transfer) function, isomerization function, hydrocracking function, and/or hydrogenolysis function, and an acidic component providing isomerization, cracking, and/or hydrocracking functions.

The platinum group, or Group VIII noble metals (ruthenium, osmium, rhodium, iridium, palladium and platinum), despite their expense, have been long recognized as particularly efficient hydrogen transfer components. Platinum per se has, in fact, proven par excellence as a hydrogen transfer component and, in fact, possesses a combination of properties which makes it particularly suitable as a component for commercial reforming catalysts. Conventional reforming catalysts have thus long employed platinum composited with a refractory, or inorganic oxide base, particularly alumina, to which halogen is added to supply the isomerization function. Such catalysts have been widely disclosed in the literature as useful for a variety of hydrocarbon conversion reactions, e.g., hydrogenation, dehydrogenation, isomerization, hydrocracking, alkylation, dealkylation, and the like. Platinum catalysts have achieved world-wide use in commercial reforming operations.

Reforming reactions involve dehydrogenation of naphthenes, dehydrocyclization and isomerization of paraffins, hydrocracking of naphthenes and paraffins, etc., the purpose of which is to supply high octane number blending stocks, aromatic solvents, and other aromatic-rich chemical products. In order to obtain the desired reaction product, or products, in good yield, it is required that the catalyst should have not only high activity and good selectivity but also excellent catalyst life. Ordinarily, in the reforming of hydrocarbons, it is required that a $C_5^+$ hydrocarbon product having a constant octane number must be obtained at low temperatures with good yield while maintaining the constant conversion of a feed stock hydrocarbon fraction to the product having a constant octane number. It is also an essential character required for a conversion catalyst to maintain a high-level yield of $C_5^+$ hydrocarbon fractions while repressing the production of cracked gas, keeping constant conversion for a long-term period. Whereas platinum catalysts have been widely utilized in catalytic reforming because of its good deydrogenation and dehydrocyclization activity, from an economical point of view the amount of the expensive platinum which is utilized must be decreased to a minimum. Another problem that must be considered as to the industrial platinum catalyst is the gradual loss of activity due to agglomerization of the platinum metal particles.

Several methods of overcoming these difficulties with platinum catalysts are known. One method for maintaining good dispersion of platinum particles in the catalyst is by adding a suitable amount of a halogen compound to a feed stock oil during operation, or redispersing the platinum particles by treating the deactivated catalyst with a halogen compound. Nonetheless, further improvements are desirable.

In responding to the social and technical need to produce even more effective catalysts, industry has turned to catalysts which employ bimetallic components to provide effective hydrogen transfer for improving the octane quality of naphthas and gasolines in commercial operations, and even more recently, attention has turned to multimetallic catalysts, or catalysts which contain three or more hydrogen transfer components, for use in the manufacture of commercially viable reforming catalysts. Platinum, e.g., which has remained a viable and outstanding hydrogenation component of such catalysts, has been used in combination with other noble and non-noble metals and composited with refractory, or inorganic oxides for use as hydrocarbon conversion catalysts. Such composites have thus included platinum in combination with such other metals as, e.g., lead, zinc, indium, thallium, iridium, tungsten, rhenium, tin, and rhenium and tin. Platinum-tin catalysts, in particular, have proven particularly useful in catalytic reforming, or hydroforming, surpassing platinum per se as an effective hydrogen transfer component for commercial reforming operations (U.S. Pat. No. 3,883,419).

Platinum-tin catalysts have been found to possess good activity in hydrocarbon conversion or reforming, activity being defined as that property which imparts the ability to produce aromatics, aromatic production (or octance improvement) generally being measured as a function of temperature, feed rate, etc. Platinum-tin catalysts should also possess good selectivity and stability in hydrocarbon conversion or reforming. Selectivity is defined as that property which imparts an ability to produce high yields of high octane number $C_5^+$ liquid products with concurrent low production of normally gaseous hydrocarbons, i.e., $C_1$-$C_4$ hydrocarbons, or solid carbonaceous by-products, and coke, which form on the catalysts during reforming. Stability or activity maintenance is activity plotted as a function of time, and good stability or activity maintenance is defined as high retention of activity and selectivity, or continued high activity and stability for prolonged periods during hydrocarbon conversion, or reforming operations. Whereas tin-containing catalysts have proven suitable in hydrocarbon conversion reactions, inclusive of reforming, these catalysts nonetheless do not possess as high selectivity and stability as desired for commercial operations.

Accordingly, in one aspect the present invention embodies a hydrocarbon conversion, or reforming catalyst comprising a composite of a refractory support material, or carrier, a Group VIII noble metal and tin prepared by a method wherein the tin component is introduced and deposited uniformly from the surface throughout said support from a solution comprising an organo thionyl compound, or compounds, and a soluble compound, or compounds, of tin. In another of its aspects, the present invention embodies a catalyst which comprises (a) a composite of a refractory support, a halogen component, a Group VIII noble metal component, particularly platinum, and a tin component uniformly dispersed throughout the support, and (b) a composite of a refractory support, a halogen component, a Group VIII noble metal component, particularly platinum, a tin component, and one or more additional metallic components uniformly dispersed from the surface throughout the support, and in either (a) or (b), supra, the tin component is introduced by impregnating the support with a solution comprising an organo thionyl compound, or compounds, and a soluble compound, or compounds, of tin.

It has thus been found that the performance of tin-containing hydrocarbon conversion catalysts, or reforming catalysts, can be greatly improved by distributing or dispersing the tin component into the inner part of the support, or catalyst composite. Past methods for the preparation of tin-containing catalysts, it has been found, do not result in a uniform distribution of the tin component throughout the support, but rather in a pronounced surface distribution of the tin. This leaves something to be desired in such catalysts. For example in the formation of, bi- or multi-metallic catalysts, e.g., a platinum-tin catalyst, past well known methods have not produced uniform distribution of the tin throughout the support even when the platinum component was, in fact, uniformly distributed from the surface throughout the inner part of the support. Because an interaction between the platinum and the tin is necessary to improve the selectivity and stability of the bimetallic catalyst as contrasted with the platinum-catalyst species per se, the selectivity and stability of such catalysts have been lacking, as contrasted with the selectivity and stability possible with catalysts otherwise similar except for the more uniform distribution of the tin throughout the catalyst.

In accordance with this invention, a refractory support, especially a porous refractory inorganic oxide support, can be employed as a suitable impregnation material. The support can contain, for example, one or more of alumina, bentonite, clay, diatomaceous earth, zeolite, silica, activated carbon, magnesia, zirconia, thoria, and the like. The most preferred support is alumina to which, if desired, a suitable amount of other refractory carrier materials such as silica, zirconia, magnesia, etc., may be added within the range of about 1 to 20 percent, based on the weight of the support. A suitable support for practice of the present invention is one having a surface area of more than 50 $m^2/g$, preferably from about 100 to about 300 $m^2/g$, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 50 to 300A. With regard to pore distribution, pore volume of pore diameter of more than 60A consists of about 60% or over, based on total volume, is preferred.

Suitable alumina materials are the crystalline alumina known as the $\gamma$-, $\eta$-, or $\chi$- alumina, which can be prepared by adding acids or bases to a solution of soluble aluminum compounds such as aluminum chloride, aluminum sulfate, sodium aluminate, aluminum alkoxide, etc., to produce a hydrated alumina followed by drying and calcination thereof. Silica, or other inorganic oxides, may be added to the alumina by coprecipitation when forming the hydrated alumina or by mixing the precipitates thereof.

The metallic component of the Group VIII noble metals of the Periodic Table includes one or more platinum group metal components such as ruthenium, rhodium, palladium, osmium, iridium, platinum, and the like. However, platinum, is the preferred component. The metal hydrogenation components can be composited or intimately associated with the porous inorganic oxide support or carrier by various techniques known to the art such as ion-exchange, coprecipitation with the alumina in the sol or gel form, etc. For example, the catalyst composite can be formed by adding together suitable reagents such as a salt of platinum and ammonium hydroxide or ammonium carbonate, and a salt of alumina such as aluminum chloride or aluminum sulfate to form aluminum hydroxide. The aluminum hydroxide containing the salts of platinum can then be heated, dried, formed into pellets or extruded, and then calcined in nitrogen or non-agglomerating atmosphere. The metal hydrogenation components can also be added to the catalyst by impregnation, typically via an "incipient wetness" technique which requires a minimum of solution so that the total solution is absorbed, initially or after some evaporation.

It is generally preferred, however, to deposit the Group VIII noble metal, or metals, on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the incipient wetness technique, or a technique embodying absorption from a dilute or concentrated solution, or solutions, with subsequent evaporation to effect total uptake of liquid.

The Group VIII noble metal component is supported on the carrier within the range of from about 0.01 to 3 percent, preferably from about 0.05 to 1 percent, based on the weight of the catalyst. In compositing the Group VIII noble metals with the carrier, essentially any soluble compound can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where the Group VIII noble metal is platinum, platinum chloride, platinum nitrate, chloroplatinic acid, ammonium chloroplatinate, potassium chloroplatinate, platinum polyamine, platinum acetylacetonate, and the like, are preferably used.

The impregnation solution of the noble metal compound is prepared by dissolving the compounds in water or any other inorganic or organic solvent. The concentration of the metallic component ranges from about 0.01 to 2 percent, preferably from about 0.05 to 1 percent, based on the weight of solution. The pH of the impregnation solution should be controlled to less than about 4, preferably less than 3, by the addition of a suitable inorganic or organic acid. By controlling the pH within these ranges, the active component can be effectively dispersed into the inner part of the catalyst. Generally, it is preferred to use a halogen-acid aqueous solution of the noble metals.

The impregnation of a solution of a soluble compound of tin into the carrier is essential, and can be carried out simultaneously with, prior to, or following the impregnating of the noble metal component into the carrier. The tin, in accordance with this invention, is added to the carrier from a solution which contains both the tin and an organo thionyl compound. Suitably, the tin and organo thionyl compounds are dissolved in a suitable solvent, preferably water, to form a solution, or each is separately dissolved in a solution, the solutions admixed and the admixed solution used for impregnation of the carrier.

Exemplary of soluble compounds of tin which can be used are the stannous or stannic halides, nitrates, sulfates, acetates, amine complexes, di- or tetra-alkyl compounds, e.g., di- or tetraethyl, propyl butyl, or octyl-tin, di- or tetra-alkoxy compounds, e.g., di- or tetra-ethoxy tin, and the like. However, the halides or the nitrates are best when considering their remarkable effect on speed of reaction, each of operation, economy, availability, and the like.

The organo thionyl compound used in the practice of this invention is one generally containing from about 2 to about 24 carbon atoms, preferably from about 2 to about 6 carbon atoms in the total molecule. The organo group is suitably alkyl, aryl, alkaryl, arylalkyl, or the like, substituted or unsubstituted, and where the ring structure is present the ring can be fused or non-fused. Illustrative of such compounds are, e.g., thionyl aniline, thionyl amine, thionyl toluidine, thionyl methyl amine, phenyl sulfoxide, phenyl sulfoxide, ethyl trichloromethyl sulfoxide, O-(phenyl sulfinyl) aniline, and the like.

Sulfoxide compounds characterized by the following formula is preferred, to wit:

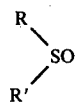

wherein R and R' are the same or different alkyl groups, and preferably an alkyl group which contains from 1 to about 3 carbon atoms. Illustrative of such compounds are dimethyl sulfoxide, diethyl sulfoxide, methyl-ethyl sulfoxide, di-n-propyl sulfoxide, and the like. These compounds are readily soluble in water, and suitably water is added to the solvents generally in the range of from about 1 to 50 percent by volume. Mineral acids such as hydrochloric acid, sulfuric acid, nitric acid and chloric acid, and organic acids such as acetic acid, citric acid and tartaric acid, can be added to the solvent, if desired. The mineral acid is added to an organo thionyl compound or to the mixture of the said organic compound and water in an amount of about 0.01 to 2 mol. percent.

The impregnating solution, as suggested, can be prepared by dissolving a tin-soluble compound in the solvent which contains the organo thionyl compound, or by admixture of the different solvents. In either event, the concentration of the tin in the impregnation solution ranges from about 0.01 to 2 percent, preferably from about 0.01 to 1 weight percent, based on the weight of the solvent.

The impregnation of the noble metal component and tin component into a carrier is carried out by impregnating the carrier with the solution of the respective metal compounds. The amount of impregnation solution used should be sufficient to completely immerse the carrier, usually within the range from about 1 to 20 times of the carrier by volume, depending on the metal concentration in the impregnation solution. The impregnation treatment can be carried out under a wide range of conditions including ambient or elevated temperatures and atmospheric or supratmospheric pressures. The noble metal or tin component can be dispersed on the carrier by such impregnation methods as the simultaneous impregnation of both components using the same impregnation solution, or more preferably the impregnation of the tin component following the dispersion of the noble metal component within the carrier.

In a preferred embodiment of the present invention:
1. a carrier is impregnated with an aqueous halogenoacid solution of noble metal compound followed by washing, drying or calcination, or both, and
2. the impregnated noble metal catalyst is impregnated with a dialkyl sulfoxide solution containing a dissolved tin compound followed by washing, drying or calcination, or both, whereby the tin component can be dispersed uniformly to the inner part of the catalyst.

To enhance catalyst performance, it is also required to add a halogen component. Fluorine and chlorine are preferred halogen components, but bromine can also be used. The halogen is contained on the catalyst within the range of 0.1 to 3 percent, preferably within the range of about 0.3 to 2 percent, based on the weight of the catalyst. When using chlorine as a halogen component, it is contained on the catalyst within the range of about 0.2 to 2 percent, preferably within the range of about 0.5 to 1.5 percent, based on the weight of the catalyst. The introduction of halogen into catalyst can be carried out by any method and at any time of the catalyst preparation, for example, prior to, following or simultaneously with the impregnation of the noble metal or tin component. In the usual operation, the halogen component is introduced simultaneously with the incorporation of the noble metal or tin component. It can also be introduced by contacting a carrier material in a vapor phase or liquid phase with a halogen compound such as hydrogen fluoride, hydrogen chloride, ammonium chloride, or the like.

The catalyst of the present invention can contain a third metallic component such as a component selected from the Group I metals, Group II metals, Group IV metals other than the essential tin component, Group VI metals, Group VII metals, and Group VIII metals. For example, copper, cadmium, zinc, germanium, lead, iridium, osmium, ruthenium, or rhodium can be used, and these metals are preferred. By adding the third component to the essential noble metal-tin component, or components, the catalyst performance can be promoted. Although it can be added by any of the conventional methods, it is preferably to add it by an impregnation prior to, following or simultaneously with the impregnation of the noble metal, tin component or halogen component within the range of about 0.01 to 2 percent, based on the weight of the catalyst.

In the manufacturing process of the present invention, drying of the catalyst is carried out by heating at a temperature about about 80° C, preferably between about 80° and 150° C in the presence of nitrogen or oxygen, or both, in an air stream, and the calcination treatment is carried out at a temperature between about 150° to 800° C, preferably about 400° to 700° C, in the presence of oxygen in an air stream. In the calcination, the tin and noble metal components are converted to an active oxide form.

The washing of the catalyst is conducted using water or an organic solvent such as alcohol, ether, hydrocarbon, and the like.

The catalyst of the present invention can be prepared in any shape, such as spheres, tablets, or extrudates, and the preferred type is dependent on the kind of hydrocarbon conversion process.

The noble metal-tin catalyst of the present invention is utilized in such hydrocarbon conversion processes as reforming, hydrocracking, catalytic isomerization, catalytic alkylation, aromatization, etc., and also in hydrofining, hydrotreating and hydrodesulfurization of hydrocarbons. The catalyst is most effective in the catalytic reforming process under the conditions exemplified in the following using hydrocarbon fractions ranging from a light naphtha fraction having a boiling point between about 40° to 120° C to a heavy naphtha fraction having a boiling point between about 100° and 170° C or a kerosene fraction having a boiling point between about 150° and 250° C.

| Feedstock Oil | Heavy Naphtha Fraction (Boiling Point: about 100–170° C) | Kerosene Fraction (Boiling Point: about 150–250° C) |
|---|---|---|
| Reaction Temperature, ° C | 500–600 | 400–600 |
| Reaction Pressure, Kg/cm² | below 35 | below 50 |
| Liquid Hourly Space Velocity, W/H/W | 0.1–10 | 0.1–10 |
| Hydrogen/Hydrocarbon, mole ratio | 0.2–20 | 0.2–20 |

The catalysts of the present invention make it possible to operate under extremely low pressures in conducting a reforming operation.

The invention will be more fully understood by reference to the following selected nonlimiting examples and comparative data which illustrate its more salient features. All parts are given in terms of weight except as otherwise specified.

Several catalysts were prepared for demonstrative purposes from portions of particulate alumina of the type conventionally used in the manufacture of commercial reforming catalysts. The portions of alumina except as relates to that used in the preparation of the platinum catalyst (Catalyst A) were impregnated in sequence with solutions of salts of the metals to be composited therewith, treated and activated and then employed as catalysts (Catalysts B–E) in a series of representative reforming reactions. These series of catalysts were each evaluated in a continuously operated reactor for reforming an n-hexane feed at essentially the same conditions of temperature, pressure, space velocity and hydrogen rate, as identified in the tabulated data. The data related to a catalyst preparation, and n-hexane feed reforming, are given below, the data on catalyst preparations being given in the examples and demonstrations immediately following:

Catalyst A (Platinum)

In the preparation of a standard platinum catalyst, 100 gr. of an alumina carrier having a specific surface area of 173 m²/gr. was impregnated with 500 ml. of an aqueous solution of 0.1 N hydrochloric acid into which 0.80 gr. of chloroplatinic acid $H_2PtCl_6 \cdot 2H_2O$ was dissolved. The impregnated alumina, after 48 hours, was separated from any remaining liquid and then dried for 4 hours at 120° C. The product catalyst contained 0.3 weight percent of platinum.

Catalyst B (Platinum-Tin)

In a well known preparation for a platinum-tin catalyst, 4.0 gr. of Catalyst A was impregnated with 25 ml. of a solution of methanol into which 0.0347 gr. of stannous chloride $SnCl_2 \cdot 2H_2O$ was dissolved. After 48 hours, the impregnated catalyst was subjected to suctioning off of methanol and then dried for 4 hours at 120° C.

Catalyst C (Platinum-Tin)

In the preparation of a platinum-tin catalyst by another technique, Catalyst A was impregnated with a solution of ethanol into which stannic chloride was dissolved according to the description in laid-open Japanese Pat. No. 1380/71 (U.S. Ser. No. 166,707 filed Jan. 16, 1962, now U.S. Pat. No. 3,214,346). After 48 hours, the impregnated catalyst was subjected to suctioning off of ethanol and then dried for 4 hours at 120° C.

Catalyst D (Platinum-Tin)

In the preparation of another platinum-tin catalyst, Catalyst D was prepared by the same method as Catalyst B except that acetone was used instead of methanol as a solvent for stannous chloride.

Catalyst E (Platinum-Tin)

In the preparation of a platinum-tin catalyst pursuant to the practice of this invention, Catalyst E was prepared by the same method as Catalyst B except that dimethyl sulfoxide DMSO was used instead of methanol as a solvent for stannous chloride.

For illustration, the cross-sections of Catalysts B and E were analyzed as to platinum and tin distribution using the EPMA ray technique, and the results illustrated in FIGS. 1 and 2.

The attached figures show the results obtained by analyzing the distribution of the active components of a catalyst by using the EPMA ray technique.

Figure 1:
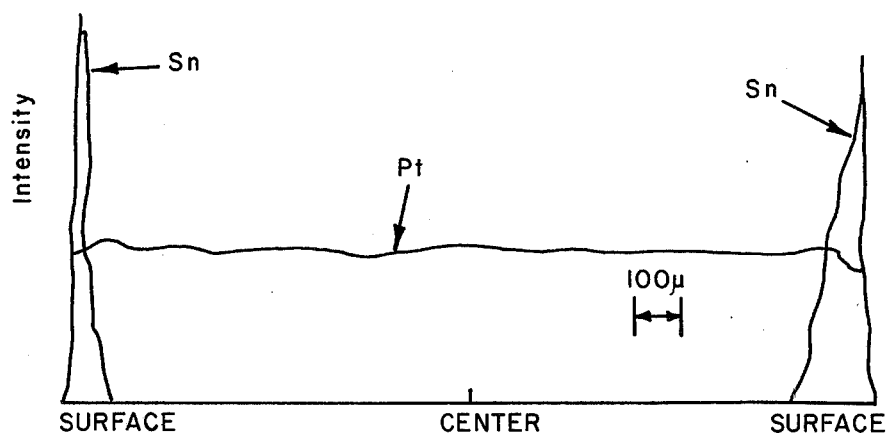
FIG. 1 shows the distribution condition of a platinum-tin catalyst (Catalyst B), prepared in a well known, or conventional manner.
Figure 2:
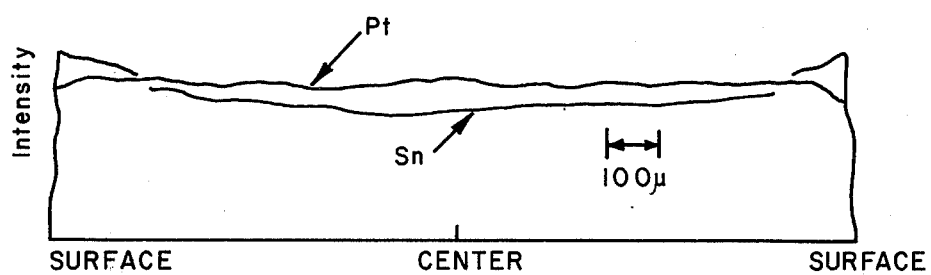
FIG. 2 shows the distribution condition of the catalyst of this invention (Catalyst E).

It is apparent from the figures that the tin component can be distributed to the inner part of the support by using dimethyl sulfoxide solvent as in the case of Catalyst E, while in contrast it is distributed non-uniformly within 100μ from the surface by using the conventional methanol solvent as in the case of Catalyst B. (Analysis is by the EPMA ray technique, using the EMX-SM apparatus of Shimazu Co. at an accelerated electric voltage of 20KV and an electric current of 0.05μA.)

Reforming Runs

These several catalysts (A–E), after preparation, were each charged into a small continuous flow reactor and subjected to the following sequence of pretreatments prior to initiation of a reforming run, to wit:

1. Calcination:
The catalysts were each calcined at 500° C for 1 hour in an air stream at a velocity of 60 ml./min.

2. $N_2$ Purge:
The reactors were each then purged with nitrogen, added at a $N_2$ flow rate of 150 ml./min., for 0.5 hour.

3. Hydrogen Reduction:

Hydrogen was then added to each reactor at a $H_2$ flow rate of 60 ml/min. at 500° C for 1 hour.

To appraise the performance of each of the catalysts, on completion of the pretreatments, an n-hexane feed was catalytically reformed under atmospheric pressure in the presence of each of Catalysts A to E. Reforming was conducted under the following conditions:

| Pressure | Atmospheric |
| --- | --- |
| Temperature | 500° C |
| Feedstock | n-hexane |
| Liquid Hourly Space Velocity | 1.0 W/H/W |
| Ratio Hydrogen/Feedstock | 12 mole |

The results are illustrated in Table 1.

As is apparent from the table, it is found that the tin component can be dispersed into the far inner part of the catalyst and the catalyst performance such as deactivation rate and benzene yield is more remarkably improved when dimethyl sulfoxide DMSD is used as a solvent of tin as compared with the case when methanol or ethanol solvent is used. The table also shows the results of the EPMA ray analysis, i.e., r/R wherein R means catalyst diameter and r means a diameter of the part having tin distribution.

TABLE 1

| Catalyst | Deactivation Rate[1] Constant $(Kd)$ $(hr^{-1})$ | Benzene[2] Yield (mole %) | r/R |
| --- | --- | --- | --- |
| A (Platinum Catalyst) | 9.8 | 3.1 | — |
| B (Well Known Platinum-Tin Catalyst) | 4.7 | 6.9 | 0.117 |
| C (Well Known Platinum-Tin Catalyst) | 5.5 | 5.1 | 0.106 |
| D (Well Known Platinum-Tin Catalyst) | 2.4 | 9.2 | 0.360 |
| E (Catalyst of the Present Invention) | 0.4 | 30.0 | 1.0 |

[1] $Kd = \dfrac{-1}{t}\left(\dfrac{1}{Xo} - \dfrac{1}{Xt}\right)$

Wherein t : reaction time, hrs.
Xo : initial benzene yield
Xt : benzene yield after t hour reaction

[2] Value after 3 hour reaction.

It is apparent that various modifications and changes can be made without departing the spirit and scope of the present invention, an outstanding feature of which is that the octane quality of various hydrocarbon feedstocks can be upgraded and improved.

Having described the invention, what is claimed is:

1. In a method for preparing a hydrocarbon conversion catalyst which comprises a Group VIII noble metal component, a tin component, and a halogen component composited with a refractory carrier, the improvement which comprises impregnating the said carrier or the carrier which supports the said noble metal component and/or halogen component with a solution comprising a soluble compound of tin dissolved in a solvent consisting of an organo thionyl compound, whereby the tin component is uniformly dispersed from the surface into the inner part of said catalyst.

2. In a method for preparing a hydrocarbon conversion catalyst which comprises a Group VIII noble metal component, a tin component, a third metallic component selected from the group consisting of copper, cadmium, zinc, germanium, lead, iridium, osmium, ruthenium and rhodium, and a halogen component on a refractory carrier, the improvement which comprises impregnating the said carrier or the carrier which supports at least one component selected from the group consisting of the said noble metal component, the said third metallic component and te halogen component, with a solution comprising a soluble compound of tin dissolved in a solvent consisting of an organo thionyl compound, whereby the tin component is uniformly dispersed from the surface into the inner part of said catalyst.

3. The method of claim 2 wherein the organo thionyl compound is one which contains from about 2 to about 24 carbon atoms in the total molecule.

4. The method of claim 2 wherein the organo thionyl compound is one which contains from about 2 to about 12 carbon atoms in the total molecule.

5. The method of claim 2 wherein the organo thionyl compound is one which contains from about 2 to about 6 carbon atoms in the total molecule.

6. The method of claim 5 wherein the organo thionyl compound is an alkyl sulfoxide.

7. The method of claim 6 wherein the alkyl sulfoxide is dimethyl sulfoxide.

8. The method of claim 1 wherein the organo thionyl compound is one which contains from about 2 to about 24 carbon atoms in the total molecule.

9. The method of claim 1 wherein the organo thionyl compound is one which contains from about 2 to about 12 carbon atoms in the total molecule.

10. The method of claim 1 wherein the organo thionyl compound is one which contains from about 2 to about 6 carbon atoms in the total molecule.

11. The method of claim 10 wherein the organo thionyl compound is an alkyl sulfoxide.

12. The method of claim 11 wherein the alkyl sulfoxide is dimethyl sulfoxide.

* * * * *